Figure 1:
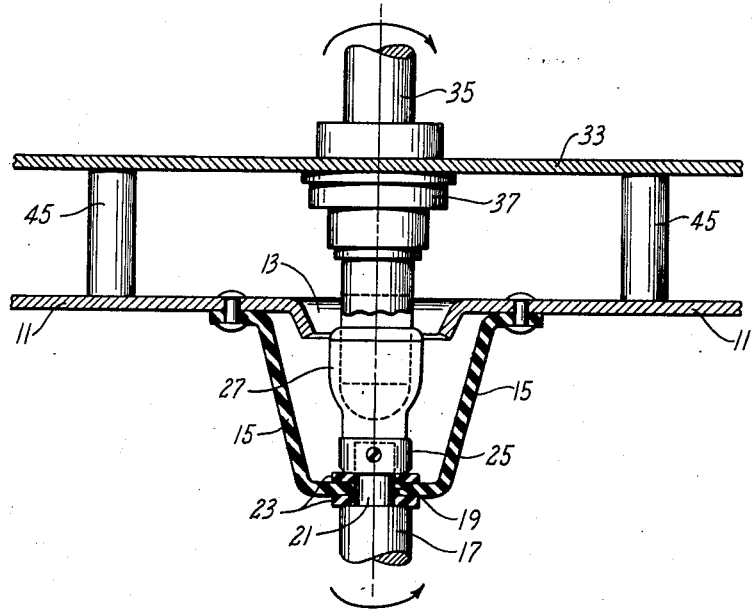

Feb. 19, 1957 R. J. STAHL ET AL 2,781,649
MULTIPLE SHAFT COUPLING
Filed Aug. 17, 1954 2 Sheets-Sheet 1

INVENTORS.
Robert J. Stahl
and
BY George R. West

ATTORNEYS

Feb. 19, 1957  R. J. STAHL ET AL  2,781,649
MULTIPLE SHAFT COUPLING
Filed Aug. 17, 1954  2 Sheets-Sheet 2

INVENTOR
Robert J. Stahl
George R. West
BY
Lippincott & Smith
ATTORNEYS

United States Patent Office 2,781,649
Patented Feb. 19, 1957

2,781,649

MULTIPLE SHAFT COUPLING

Robert J. Stahl and George R. West, Redwood City, Calif., assignors to Color Television Incorporated, San Carlos, Calif., a corporation of California Application August 17, 1954, Serial No. 450,362

4 Claims. (Cl. 64—1)

This invention relates to a coupling means particularly adapted for removably coupling driving and driven shafts, although permitting ready disengagement when desired without time-consuming separating manipulations.

In an apparatus of the type wherein one complete unit is supported in juxtaposition and removably connected to another unit and a positive drive is to be maintained between driving and driven shafts the ends of the separate units which substantially meet or abut each other may form complementary parts of a coupling which is readily connectable and yet equally as easily disconnected. A unit of this type is particularly useful provided it is efficient in transmitting motion between the two elements. However, the coupling acquires a much greater utility when it permits driving, without binding, between driving and driven elements which are misaligned both eccentrically and angularly to minor extents.

Various forms of couplings have heretofore been suggested in the art for such purposes but usually have the drawback of their complexity and prove impractical from a commercial viewpoint because of the need of numerous expensive parts which are neither readily connected or disconnected. The present invention is directed to a coupling which provides for lost motion within acceptable and tolerable limits and also to one which functions equally well whether there be generally precise alignment or whether there be either or both minor angular and lateral misalignments between the driving and driven elements. This is particularly true where a plurality of driving connections are to be made between separate units and a multiplicity of driving and driven elements are to be simultaneously interlinked between two housing components. In many cases the degree of engagement of the component may be subject to variation depending upon the manner of supporting devices to drive and the devices to be driven. Even under such circumstances it is important that the couplings to unite such a multiplicity of shafts shall each be of a type which is quickly engageable and disengageable and still be free from complexities of mechanism and reasonably fool-proof in operation.

Further than this, the coupling mechanism herein to be described provides for removably connecting a plurality of separable elements through components of which the manufacturing costs are comparable with those forms of connections between driving and driven elements which are inherently rigid and fixed and do not permit of ready disengagement or separation of separate housing members in which the driving and driven elements are incorporated.

It is also important that a coupling of the separable type function with no extra parts, except, for instance, certain components such as sealing means used to maintain a dust-free housing, over and above those included in any other rigid types of components heretofore used.

In its preferred form the coupling of this invention has one part connected to or formed as an integral part of a driving shaft contained within one housing instrumentality. The driven shaft is adapted to be contained within a second housing and to have the complementary coupling part attached thereto integrally or rigidly connected thereto.

One of the shafts and the therewith associated coupling component is arranged to protrude through a bearing surface formed in the wall of the housing to terminate in the region of the opening. The second of the shafts, to which the second coupling component is secured or with which it is directly formed, is supported from suitable bearing elements contained within the other housing and generally aligned with an opening into the housing toward which opening the shaft is faced and with which it is aligned. Internally of the second housing a suitable bearing support provides for both carrying and guiding the shaft generally to maintain its location relative to the housing opening and thus to the complementary shaft contained within the second housing with which the coupling is to be established.

The two coupling parts which terminate the respective shafts combine to form coupling sections of the male and female variety. The female section of the coupling is formed as a bifurcated element having an end slot of generally Y-shaped configuration merging into a stem section. The male section terminates as a flattened blade adapted to be positioned with the bifurcated end of the other shaft and to be located within the stem and slot of the Y-shaped member. Generally speaking, the flattened blade has one dimension (its thickness) approximating that of the width of the stem forming the end slot of the Y-shaped configuration. The second dimension of the flattened blade approximates that of the dimensions of the bifurcated element considered transverse to its axis. The combination of the blade and bifurcated end of the two meeting shafts permit a reasonable amount of misalignment between the shafts to be coupled, whether that misalignment be an eccentric displacement of the driving and driven shafts considered as normally parallel components or whether the displacement be an angular displacement of the two shafts relative to each other provided, of course, that the component from what at least one of the shafts extends is generally resiliently supported so that it may be shifted to slight extents either laterally or angularly to permit alignment through the coupling with the other component.

Accordingly, one of the rotatable components which is to be coupled and which may be either the driving or driven shaft element is maintained in the supported position within one of the housing elements preferably by a resilient mounting of a sort which will permit the complete assembly to be tilted or shifted somewhat to accommodate it and its part of the coupling to the shaft displacement of the other component. Disengagement of the housing members results in the disengagement of the coupling means between such plurality of shafts as it may be necessary to couple and this disengagement can be had instantly and without making mechanical disconnects or adjustments of any sort whatsoever between the coupled and non-coupled components.

Openings in one of the housing members serve to provide a ready guide for the engagement of the shaft elements with respect to each other. If desired, the blade of the male coupling section may have its outer edge of tapered or wedge-like form so as more readily to provide for quick engagement and disengagement with the bifurcated female section. Like angular rotational position of the driving and driven shafts with respect to each other is maintained substantially identical by virtue of the slot of the Y-shaped configuration in the bifurcated member preventing angular displacement other than normal lost motion by any substantial amount between the driving shaft and the driven shaft.

From the foregoing it is apparent that one of the objects of this invention is that of providing a quick engaging or disengaging coupling to establish a driving connection between driving and driven elements, which coupling insures a substantially positive drive between driving and driven elements and nonetheless permits of minor eccentric or angular (or both) initial misalignments between the driving and driven shafts.

Also it is an object of the invention to provide a mechanical coupling between driving and driven elements which shall be readily and quickly disengaged and can also be manufactured at a cost commensurate with other known forms of coupling.

Other objects of the invention are those of providing an assembly for driving rotary components contained within one housing in which elements are included which are driven through the couplings from elements contained in the second housing which is particularly adapted to conditions wherein there shall be relatively no strain between the parts and in which there can be, if necessary, heavy torque requirements and minor misalignment of the driving and driven shafts is tolerable.

Other objects of the invention are those of providing a form of coupling particularly useful to couple a plurality of shafts contained within one apparatus housing to shaft elements contained within a second apparatus housing which is adapted to be supported in juxtaposition to the first housing, it being understood there is general alignment between the relative position of the shafts within each housing and of the plurality of meeting or generally abutting shafts which are adapted to be connected through the coupling. One of each pair of shafts constitutes a driving element and the other a driven element.

Figure 2:
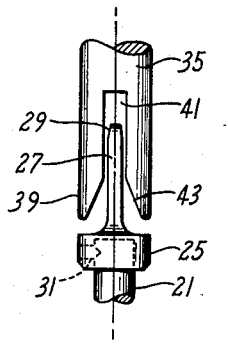
Figure 3:
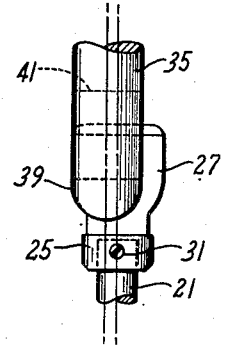
Figure 4:
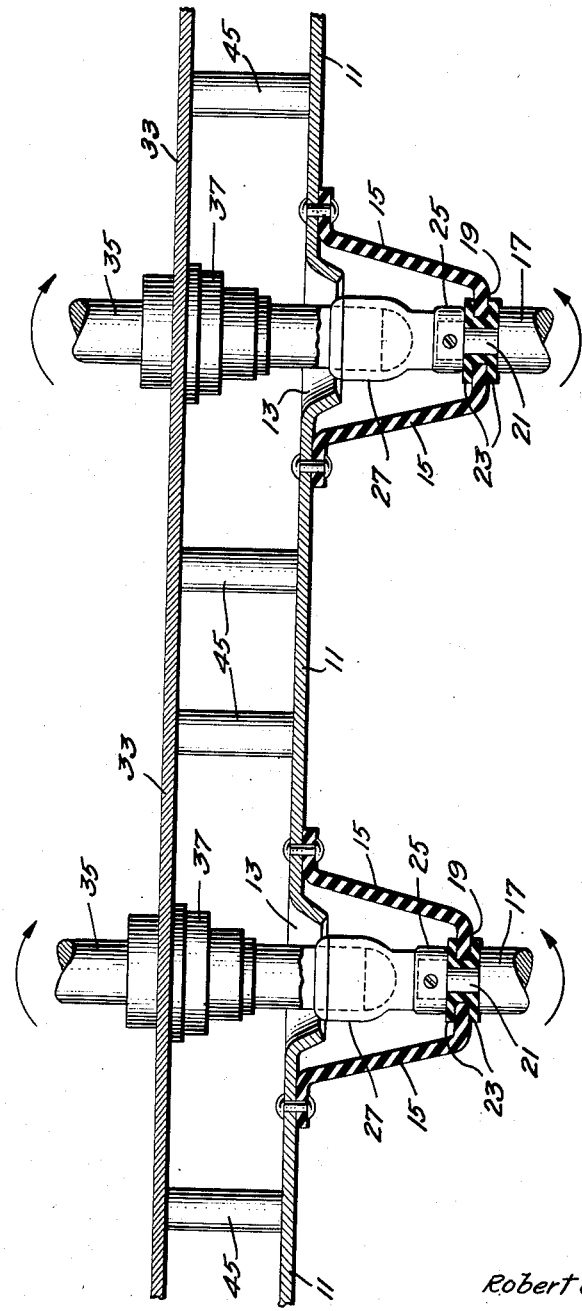

Other and further objects of the invention will, of course, become apparent from the following descriptions considered in connection with the various figures of the drawings in which:

Fig. 1 is a view partly in section showing the relative relationship of the support bearings within separable but juxtapositioned housing members through which the ends of the driving and driven shafts protrude and to which shaft ends the driving and driven couplings are attached; it being understood that for illustrative purposes only one pair of shafts is shown although in use the components are adapted to a multiplicity of such connections and likewise that any desired form of shaft rotating mechanism may be used for the driving shaft and that the driven shaft may drive any component desired;

Fig. 2 is a view looking at the coupling means per se from a direction in which the blade end component appears in its narrowest dimension (i. e., thickness) to show its driving location with respect to the slot of the complementary Y-shaped bifurcated element;

Fig. 3 shows particularly the relationship of the blade ended coupling section and its shaft positioned relative to the bifurcated section of the coupling and its shaft but turned at 90° with respect to the showing of Fig. 2, with Fig. 3 also indicating generally a possible limited eccentric displacement between the driving and driven shaft elements; and, Fig. 4 is a view showing a multiplicity of driving and driven shafts of the general character shown by Fig. 1.

Considering the drawings and first referring to Fig. 1 the housing wall 11 (of which only a part is shown for convenience) has an opening generally indicated at 13 therein at each point through which shaft couplings are to be made. In practice it is usual to have a multiplicity of such openings in the housing wall in order that connections may be made to all separate shafts contained within the housing in which the driving components or shafts are included. Each opening is preferably of generally circular configuration and slightly greater in diameter than the maximum dimension of the coupling component on the end of the shaft adapted to be inserted through the opening. Supported within the housing from any suitable support (not shown) and adapted to pass through the housing toward the opening 13 there is supported a conventionally represented shielding element 15 through which a shaft 17 is passed by away of the opening 19. The shield 15 is generally reinforced at its opening and as indicated at 23. It is flexible or resilient in character so as to be capable of movement and yet adequate to shield the interior of the housing from dust and particles due to the presence of the various openings 13. While this dust shield 15 is shown in an extremely conventional manner, it is pointed out that it is usually of a rubber or synthetic character and is attached in any suitable way to the housing wall. The indicated rivets are merely one example. In most cases where rivets are used to secure the shields to the housing wall it is preferable to press the flattened part of the shield to the housing by way of a further washer ring (not shown) which rests against the base of the conical shield.

The end of the shaft 17 protruding through the opening 19 in the shield may be narrowed or reduced in diameter, as shown for example at 21, at the point where it passes through the opening and under these conditions a suitable collar secured to the shaft by any desired means such as the indicated set screw in order to hold the indicated blade component formed at the end of the collar to the shaft. Each of the shafts (of which only one is shown by the drawing) extends outwardly toward the housing wall from the shield opening and is resiliently mounted in the shield element 15 with the fit sufficiently tight effectively to close the housing about the shaft and yet sufficiently resilient to permit a moderate lateral shifting of the shaft protruding therethrough.

The form in which the invention which has been illustrated has the collar 25, which fits to the reduced diameter portion 21 of the shaft, terminated in the flattened blade element 27, of which the forward end 29 is appropriately tapered. This blade element forms the male coupling section of the coupling component. While it is illustrated as secured by means such as the set screw to the shaft it is to be noted that the element may be integrally formed with the shaft and be forced through the opening in the shield 15 provided the opening can be stretched sufficiently to accommodate this blade member.

The second housing wall is schematically indicated and shown by the conventional representation at 33. This housing is positioned, in use, in juxtapositioned relationship relative to the housing of which only the wall 11 is shown. The juxtapositioning of the two housings may be maintained by suitable supports and securement means or, if desired, the two housings may be held together gravitationally with the lateral locations of one with respect to the other established by appropriate guide pins or directly by the shaft components protruding through the housing wall 33 and adapted to be aligned with the opening 13 in the housing wall 11.

The shaft 35 which passes through the wall 33 is appropriately and suitably supported within the housing and passes through the housing wall by way of a conventionally indicated bearing element 37. The shaft 35 terminates in a bifurcated end 39 which forms a Y-shaped configuration with the stem of the Y shown at 41 and the lateral sides thereof indicated at 43. The open and tapered end of the Y forms two guiding paths for locating this bifurcated element with respect to the blade 27 on the shaft end 21.

When the housing 33 is supported in juxtaposition relative to the housing wall 11 it is, in the construction shown by way of example in Fig. 1 of the drawings, spaced appropriately from the housing wall 11 by way of the spacers 45. The bifurcated end of the shaft 39 when protruding within the housing wall 11 through the opening 13 is caused to straddle the blade 27 on the end 21 of the shaft member 17. The spacer 45 provides an appropriate separation between the two housing walls so that the coupling sections are caused to meet as generally shown by Figs. 2 and 3, but it is to be understood that the spacing may be greater or less than that indicated or the housing walls alternatively may abut.

In this arrangement the driving connection of two shafts of a large group normally used is schematically illustrated as being provided by the blade member 27 which may be driven (by a drive device not shown) from within the housing in which it is held, although it will be apparent that the driving element may, if desired, be reversed and the bifurcated element may serve to drive the blade.

It is important to the consideration of the invention that where there is either an eccentric or angular displacement of one of the shafts 17 or 35 with respect to the other that there shall be suitable resilience of either the shaft supports or the component driven by the shafts. Lost motion of the type introduced by the coupling section shown is reduced to a limited extent and, as will be apparent from the various figures of the drawings and particularly Figs. 2 and 3, the degree of engagement is in no way critical and only need be such that no strain occurs. At the same time the disengagement and engagement of the two members with respect to each other and all of the like components is readily established for the complete group taking recourse to the slotted Y-shaped type of component. The same or the prescribed rotational angle of the two shafts with respect to each other is readily established by the relationship of the blade and slot widths.

The apparatus for supporting the blade element 27 of the coupling combination is herein illustrated as have its end 21 of reduced diameter and having the blade 27 formed upon a collar 25 removably secured thereto. Without departing from the spirit and scope from what is herein presented as the invention, it is to be understood that the blade 27 may be formed directly on the end of the shaft 17 as a unitary part thereof as has already been suggested.

From the foregoing description, it will be apparent that the multiple coupling herein described functions with a plurality of bearing surfaces or elements held in a support and adapted to hold and locate one set of shafts. Each of these supported shafts protrudes through the bearing surface beyond the support means. With this first set there is combined a second assembly in which a second set of shafts is supported with its bearing means generally aligned relative to the first assembly. It is important that the bearings of at least one of the sets of shafts shall be resiliently supported so that the bearings may be held in resilient relationship, both with respect to each other and with respect to the shafts with which coupling is to be established. This accommodates possible misalignment of the respective shafts, both with regard to angularity and eccentricity.

Fig. 4 shows a plurality of driving and driven shaft elements multiply coupled together. It shows the general arrangement of Fig. 1 with the coupling connections of the type particularly illustrated by Figs. 2 and 3. The showing exemplifies the feasibility of providing a multiplicity of coupling elements whereby it is possible to avoid the necessity of extremely close mechanical tolerances between centers of the individual shafts, and at the same time, the combination provides for ready coupling and decoupling of the entire assembly. In the showing of Fig. 4 parts of the character depicted by Figs. 1, 2 and 3 are given corresponding numbering for ready identification and although for convenience of illustration it has been made to appear as if there were precise alinement between the driving and driven shafts and likewise it has been made to appear as though the shafts were concentric with respect to their axes it will be appreciated from what has been stated above that in the actual operation the driving and driven shafts may be eccentric to each other and even at an angle with respect to each other without in any way affecting the nature of the driving coupling therebetween.

Having now described the invention, what is claimed is:

1. Multiple shaft coupling mechanism for connecting between a plurality of driving and driven shaft mechanisms of which the driving shafts are contained in one assembly and the driven shafts are contained in the second assembly, one of said assemblies being adapted for juxtapositioning relative to the other, comprising a support means having a plurality of bearing surfaces adapted to hold and locate one set of shafts, each shaft of the set protruding through its bearing surface beyond the support means, a second support means in which the second set of shafts is supported, bearing means for supporting the second set of shafts in generally aligned position relative to the first set, one of each of the shafts of one set terminating in a flattened blade and the other set of shafts terminating as a bifurcated element having an end slot of generally Y-shaped configuration, the flattened blade being of a thickness approximating that of the width of the stem of the Y-shaped element and adapted to fit therein and being of a transverse dimension of the order of that of the bifurcated element transverse to its axis, means to mount the bearings of at least one of the sets of shafts individually resiliently with respect to each other and to the remaining shafts of the set, the normal bearing support position being to approximately align the supported shaft with its complementary shaft of the other set but movable to accommodate misalignment of the respective shafts, a driving connection between the two shafts being established when the blade members of one set of the shafts are positioned within the slots of the Y-shaped members of the other set of shafts and supports are juxtapositioned relative to each other to permit penetration of each blade-ended shaft into its complementary bifurcated-ended shaft.

2. The apparatus claimed in claim 1 comprising, in addition, means to space the assemblies relative to each other.

3. The apparatus claimed in claim 1, comprising, in addition, a housing wall through which the shafts protrude and a dust-sealing means surrounding each shaft of at least one set to prevent dust from entering the shaft housing portion through which the shafts protrude.

4. The apparatus claimed in claim 3 wherein the said open Y-shaped end of each bifurcated member is tapered and wherein the outer end of each blade member is wedged so that the taper end wedge-like terminations serve to guide the blade of the complementary blade and bifurcated members to alignment and to the same rotational angle.

References Cited in the file of this patent

UNITED STATES PATENTS 1,173,682    Rensch _____ Feb. 29, 1916

FOREIGN PATENTS 372,685    Germany _____ Mar. 31, 1923